United States Patent
Studenberg, Jr. et al.

(10) Patent No.: US 9,596,685 B1
(45) Date of Patent: Mar. 14, 2017

(54) METHOD AND APPARATUS FOR HIGH DATA RATE HIGH FREQUENCY DATA LINK (HDR-HFDL)

(71) Applicants: Fred J. Studenberg, Jr., Melbourne, FL (US); Kenneth K. Hamby, Melbourne Beach, FL (US); David V. Kazanovicz, Palm Bay, FL (US); Walter H. Hewett, Palm Bay, FL (US); Bikram S. Aulakh, Melbourne, FL (US); Scott F. Bauler, Melbourne, FL (US)

(72) Inventors: Fred J. Studenberg, Jr., Melbourne, FL (US); Kenneth K. Hamby, Melbourne Beach, FL (US); David V. Kazanovicz, Palm Bay, FL (US); Walter H. Hewett, Palm Bay, FL (US); Bikram S. Aulakh, Melbourne, FL (US); Scott F. Bauler, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 238 days.

(21) Appl. No.: 14/465,414

(22) Filed: Aug. 21, 2014

(51) Int. Cl.
*H04W 72/04* (2009.01)
*H04L 29/08* (2006.01)
(Continued)

(52) U.S. Cl.
CPC ........... *H04W 72/0453* (2013.01); *H04L 1/16* (2013.01); *H04L 67/12* (2013.01);
(Continued)

(58) Field of Classification Search
CPC .. H04W 72/10; H04B 7/18506; H04M 15/61; H04L 1/1001
See application file for complete search history.

(56) References Cited

U.S. PATENT DOCUMENTS

| | | | |
|---|---|---|---|
| 8,243,632 B1 * | 8/2012 | Oh ....................... | H04W 92/20 370/277 |
| 2003/0093187 A1 * | 5/2003 | Walker .................. | B64C 13/20 701/1 |

(Continued)

*Primary Examiner* — Chi H Pham
*Assistant Examiner* — Shailendra Kumar
(74) *Attorney, Agent, or Firm* — Angel N. Gerdzhikov; Donna P. Suchy; Daniel M. Barbieri

(57) ABSTRACT

A method and apparatus for establishing a high data rate high frequency data link (HDR-HFDL) between aircraft and ground stations enhances the aircraft HFDL data radio to transmit at an HDR frequency assigned by a ground station and transmitted to the aircraft via the HFDL frequency assigned to the ground station. The ground station may select and transmit an alternate HDR frequency if necessary. In Phase I, existing aircraft subsystems and ground stations will be configured for HDR downlink only, but an aircraft subsystem may additionally receive HDR data packets if propagation conditions allow. In Phase II, dedicated HDR ground stations and enhancements to existing aircraft subsystems will provide for full HDR uplink and downlink capability. Dedicated HDR ground stations may select an HDR frequency from the band including the assigned HFDL frequency or transmit at an assigned HDR frequency.

17 Claims, 3 Drawing Sheets

(51) Int. Cl.
*H04L 1/16* (2006.01)
*H04W 72/10* (2009.01)
*H04B 7/185* (2006.01)
*H04M 15/00* (2006.01)

(52) U.S. Cl.
CPC ......... *H04B 7/18506* (2013.01); *H04M 15/61* (2013.01); *H04W 72/10* (2013.01)

(56) References Cited

U.S. PATENT DOCUMENTS

| | | | | |
|---|---|---|---|---|
| 2006/0046715 | A1* | 3/2006 | Burgemeister | H04B 7/18506 455/431 |
| 2008/0274734 | A1* | 11/2008 | Kostanic | H04B 7/18508 455/431 |
| 2012/0113823 | A1* | 5/2012 | Zeng | H04B 7/18506 370/252 |
| 2014/0274176 | A1* | 9/2014 | Baqar | H04B 7/18506 455/501 |

* cited by examiner

METHOD AND APPARATUS FOR HIGH DATA RATE HIGH FREQUENCY DATA LINK (HDR-HFDL)

FIELD OF THE INVENTION

The present invention relates generally to wireless communication systems. More particularly, the present invention relates to wireless high frequency data links between aircraft end systems and corresponding ground-based stations.

BACKGROUND

High Frequency Data Link (HFDL) is an ACARS communications protocol used to transmit AOC, CPDLC, and ADS messages between aircraft in flight and ground-based HFDL stations (downlink), using high frequency radio waves. The existing aeronautical HFDL system provides for a maximum data rate of 1.8 Kb/sec. Commercial and government users have requested high data rate (HDR) capability in excess of 1.8 Kbs, particularly for downlink (ex.—air-to-ground) use. Advanced waveforms can provide these higher data rates at signal/noise ratios comparable to existing HFDL waveforms as well as providing additional robustness under multipath conditions. However, re-engineering existing HFDL infrastructure (aircraft equipment as well as HFDL-enabled ground stations and their assigned frequencies) for new emission types and new frequency assignments may be a lengthy and expensive process. It may therefore be desirable to enable HDR capability, especially for downlink, over current HFDL equipment and within currently assigned ground station frequencies.

SUMMARY

Embodiments of the present invention are directed to a method and apparatus for transmitting high data rate (HDR) packets via high frequency data link (HFDL). In embodiments, an aircraft subsystem may monitor HFDL-enabled ground stations via the HFDL data radio aboard the aircraft. In embodiments, the aircraft subsystem may receive, via the HFDL data radio, at least one HDR frequency selected by the ground station from a frequency band, and transmitted by the ground station at the HFDL frequency assigned to the ground station from the frequency band. In embodiments, the aircraft subsystem may log into the received HDR frequency via the HFDL data radio. In embodiments, the aircraft subsystem may transmit to the ground station HDR data packets at the received HDR frequency. In embodiments, the aircraft system may be further configured to receive HDR data packets transmitted by the ground station at the received HDR frequency.

Embodiments of the present invention are further directed to a method and apparatus for receiving HDR data packets via HFDL. In embodiments, an HFDL-enabled ground station may include an HDR receiver that selects an HDR frequency from the same frequency band from which the HFDL frequency of the ground station is assigned. In embodiments, the ground station may transmit the selected HDR frequency to aircraft at its assigned HFDL frequency. In embodiments, the ground station may recognize a successful login to the selected HDR frequency by an aircraft. In embodiments, the ground station may receive HDR data packets transmitted by the aircraft at the selected HDR frequency (ex.—HDR downlink). In embodiments, the ground station may decode, demodulate, or acknowledge receipt of the HDR data packets.

BRIEF DESCRIPTION OF THE FIGURES

The advantages of the invention may be better understood by those skilled in the art by reference to the accompanying figures in which.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1:
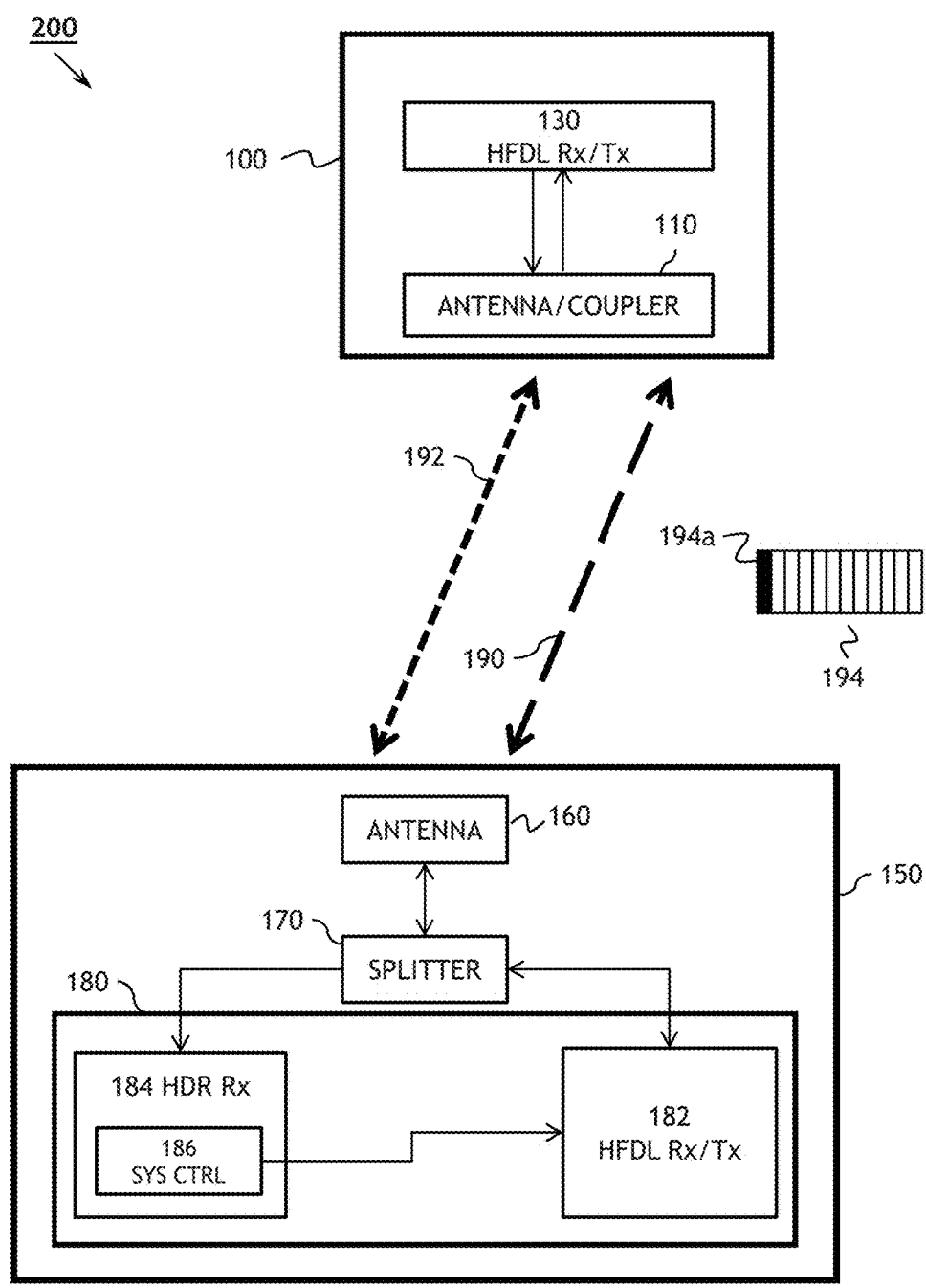
FIG. 1 illustrates an aircraft subsystem and ground station with HDR-HFDL downlink according to an embodiment of the present invention.

FIG. 1 illustrates a Phase I implementation of an HDR-HFDL system 200 according to embodiments of the present invention, including aircraft HFDL subsystem 100 and ground station 150. In embodiments, aircraft subsystem 100 may include HFDL-HDR receiver/transceiver (ex.—data radio) 130, configured to transmit and receive (via antenna/coupler 110) HFDL data packets 194 on identified HFDL frequencies 190 assigned to known HFDL ground stations 150. In embodiments, Phase I software upgrades to HFDL-HDR receiver/transceiver 130 can provide HDR downlink capability via HDR frequency 192. In embodiments, aircraft HFDL subsystem 100 may monitor known HFDL ground stations 150 and receive an HDR frequency 192 from HDR-enabled ground station 150. In embodiments, HFDL receiver/transceiver 182 of ground station 150 may broadcast the HDR frequency 192 via HFDL squitter 194a (zero slot of HFDL slot structure 194) on HFDL frequency 190. In some embodiments, HFDL receiver/transceiver 182 may broadcast the HDR frequency 192 at intervals of 32 seconds. In embodiments, HFDL-HDR receiver/transceiver 130 may log into a transmitted HDR frequency 192 rather than the standard HFDL frequency 190. In embodiments, login to an HDR frequency 192 may use a slot protocol identical to that for HFDR frequency 190. In embodiments, upon successful login to HDR downlink frequency 192, antenna/coupler 110 of aircraft subsystem 100 may tune to HDR downlink frequency 192. In embodiments, ground station 150 may then expect all subsequent transmissions from that particular aircraft (ex.—aircraft subsystem 100) on HDR frequency 192. In embodiments, should poor propagation prevent aircraft subsystem 100 from successfully logging into HDR frequency 192, HFDL-HDR receiver/transceiver 130 may revert back to HFDL frequency 190 and transmit at that frequency (albeit at a bitrate under 1.8 Kbs).

In embodiments, Phase I ground station 150 may incorporate a standard HFDL-enabled ground subsystem including antenna 160, splitter 170, and HFDL subsystem 180, including HFDL receiver/transmitter 182, HDR receiver 184, and HDR system control 186. In embodiments, HDR receiver 184 may utilize the same antenna 160 (via splitter 170) as HFDL receiver/transceiver 182. In embodiments, HDR system control 186 may select an HDR receive frequency 192 (ex.—HDR channel) from the allocated frequency band. For example, if ground station 150 is broadcasting at its assigned HFDL frequency of 8927 kHz, an HDR downlink frequency 192 may be selected from within the same aeronautical band (ex.—8815 kHz to 9040 kHz). In embodiments, HDR system control 186 may then forward the assigned HDR frequency 192 to HFDL receiver/transceiver 182 for transmission to aircraft 100 via the assigned HFDL frequency 190 of ground station 150. In embodiments, slot zero 194*a* of HFDL slot structure 194 may be an HFDL squitter including the HDR downlink frequency 192. In embodiments, HDR receiver 184 may then receive HDR packets transmitted by HFDL-HDR receiver/transceiver via the HDR downlink frequency 192 assigned by HDR system control 186 to HDR receiver 184. In embodiments, the TDMA slot structure of HDR downlink 192 may be identical to, and synchronized with, the slot structure 194 of main HFDL frequency 190 (the exception being that all slots will be dedicated to HDR downlink, rather than slot zero 194*a* being occupied by the HFDL squitter). In embodiments, HDR-HFDL ground station 150 may receive and merge simultaneous downlink streams on HDR frequency 192 and HFDL frequency 190, selecting for processing the correct blend of downlinks from various aircraft with which ground station 150 is then in contact. In embodiments, HDR-HFDL ground station 150 may demodulate or decode HDR data packets or HDR data streams received from multiple aircraft. In embodiments, HDR-HFDL ground station 150 may acknowledge receipt of an HDR data packet or login to a selected HDR frequency, e.g., via HFDL squitter 194*a*.

In embodiments, HDR system control 186 may select HDR frequency 192 based on selection parameters, including measured channel energy, known voice assignments with which aircraft downlinks might interfere, or channel activity measured by (and provided to ground station 150 by) the HDR system control units of other ground stations. In embodiments, it is expected that the HDR downlink frequency 192 may not require frequent changing once selected. In embodiments, HDR system control 186 may select (and forward to HFDL receiver/transceiver 182 for transmission) an alternate HDR downlink frequency 192 based on alternate selection parameters, including unexpected interference on the current downlink frequency or reports of HFDL-HDR downlink interference with another assigned use of the current frequency. In some embodiments, HFDL-HDR system 200 may include HDR uplink capability as well as downlink capability. In embodiments, propagation conditions may allow aircraft subsystem 100 to receive (ex.—decode, demodulate) HDR packets transmitted via HDR frequency 192 by ground station 150.

Figure 2:
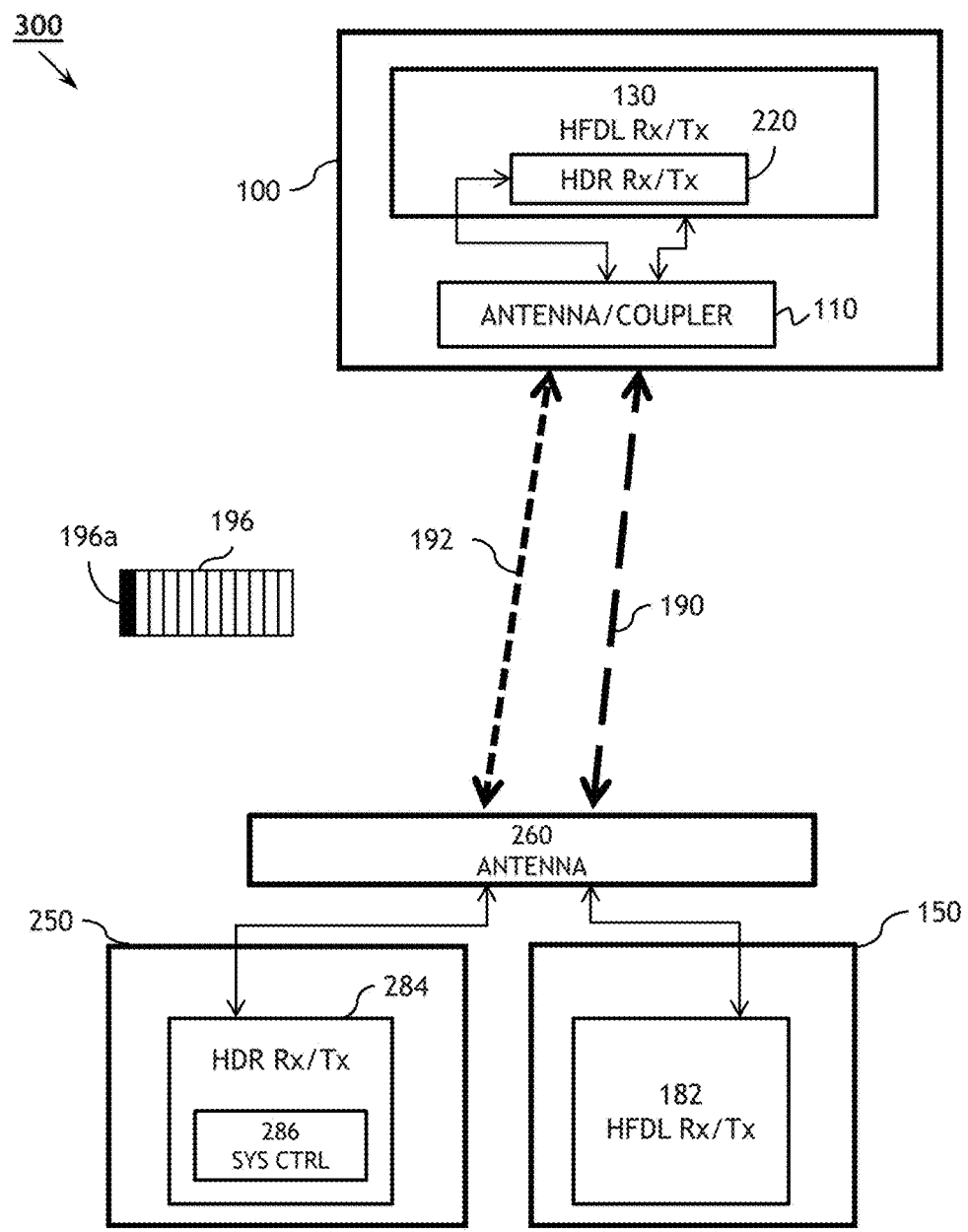
FIG. 2 illustrates an aircraft subsystem and ground station with HDR-HFDL downlink and uplink according to an embodiment of the present invention.

FIG. 2 illustrates a Phase II implementation of an HDR-HFDL system 300 including full HDR uplink and downlink capability according to embodiments of the present invention. In embodiments, HFDL data radio 230 of aircraft subsystem 100 may include software upgrades to enable full HDR uplink/downlink capability (via HDR receiver/transceiver module 220), enabling two-way HDR transmissions via assigned HDR frequency 192, legacy HFDL transmissions via assigned HFDL frequency 190, or HDR downlink/HFDL uplink operations according to Phase I embodiments of the present invention. In embodiments, slot zero 196*a* of HDR slot structure 196 may serve as an HDR squitter, similarly to slot zero 194*a* of HFDL slot structure 194. In embodiments, dedicated HDR ground station 250 may operate in parallel with HFDL-enabled ground station 150, whereby the two ground stations 250 and 150 share common antenna 260. In some embodiments, HDR ground station 250 and HFDL ground station may incorporate separate antennas. In embodiments, dedicated HDR ground station 250 may include HDR receiver/transceiver 284 and HDR system control 286. In embodiments, HDR system control 286 may select an HDR frequency 192 from the frequency band including the HFDL frequency 190 assigned to HFDL ground station 150. In some embodiments, HDR ground station 250 may transmit at an assigned HDR frequency 192. In embodiments, software-upgraded aircraft subsystem 100 may receive, as well as transmit, HDR data packets via HDR receiver/transceiver 220 of aircraft data radio 130.

Figure 3:
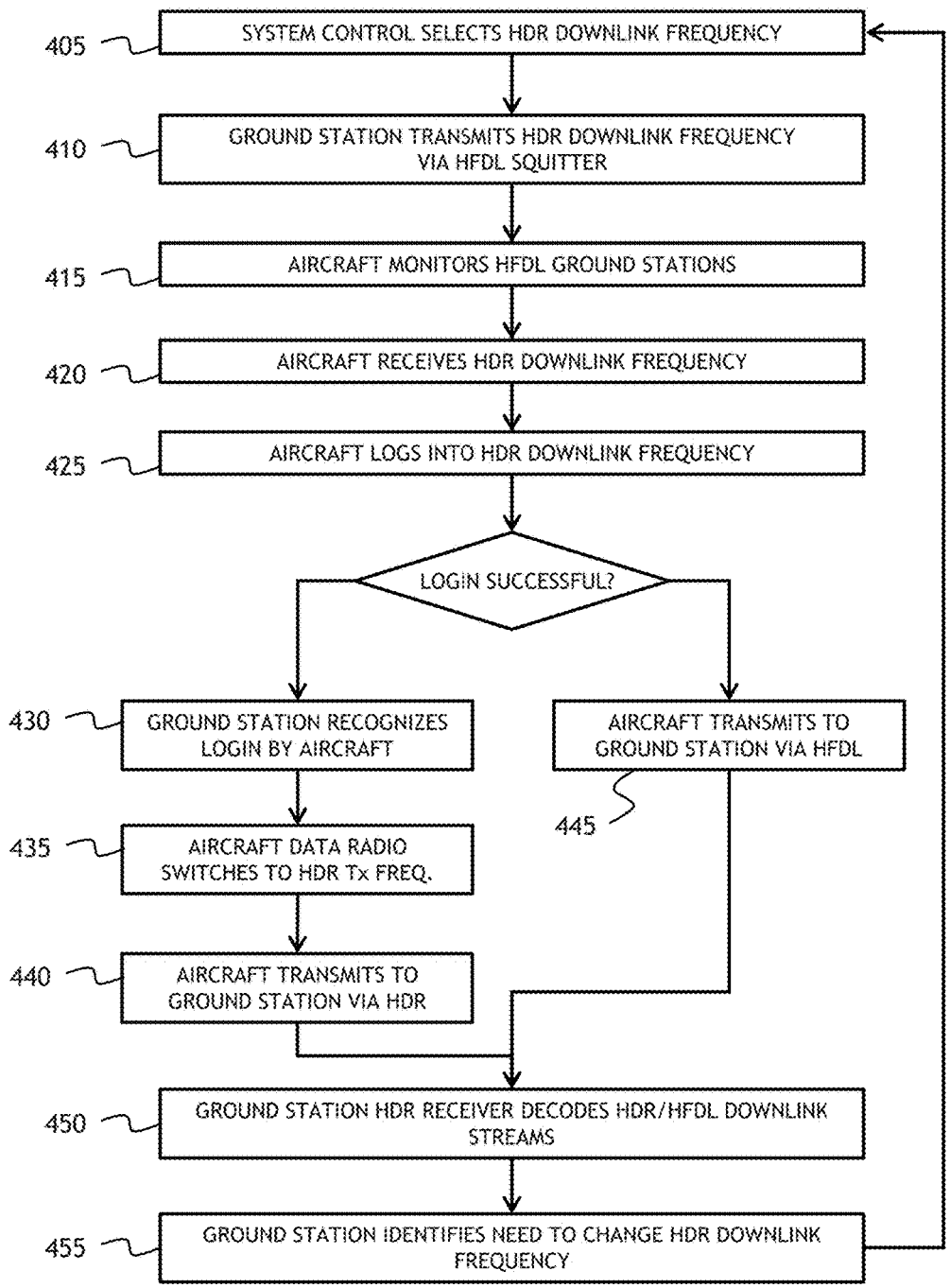
FIG. 3 is a process flow diagram illustrating a method according to embodiments of the present invention.

FIG. 3 depicts a process flow diagram for a method 400 of establishing and implementing HDR-HFDL between ground station/s 150 and aircraft subsystem 100 according to embodiments of the present invention. At step 405 of method 400, HDR system control 186 of ground station 150 selects HDR downlink frequency 192 from the frequency band including the HFDL frequency 190 assigned to ground station 150. At step 410, HFDL receiver/transceiver 182 of ground station 150 receives HDR downlink frequency 192 from HDR system control 186 and transmits HDR downlink frequency 192 via HFDL squitter 194*a* at HFDL assigned frequency 190. At step 415, aircraft subsystem 100 continually monitors known ground stations 150. At step 420, HFDL data radio 130 of aircraft subsystem 100 receives HDR downlink frequency 192. At step 425, HFDL data radio 130 attempts to log into HDR downlink frequency 192. If login is unsuccessful, at step 445 HFDL data radio 130 may continue transmitting HFDL data packets at HFDL assigned frequency 190 to ground station 150. If login is successful, at step 430 ground station 150 recognizes a successful login to HDR downlink frequency 192. At step 440, HFDL data radio 130 tunes antenna/coupler 110 of aircraft subsystem 100 to HDR downlink frequency 192. At step 440, HFDL data radio 130 transmits HDR data packets to ground station 150 at HDR downlink frequency 192. At step 450, ground station 150 receives HDR data packets transmitted by HFDL data radio 130, in addition to other HDR and HFDL data streams received from aircraft with which ground station 150 is then in contact. In embodiments, ground station 150 may additionally demodulate or decode received HDR data packets or data streams. In embodiments, ground station 150 may additionally acknowledge receipt of an HDR data packet transmitted by HFDL data radio 130, e.g., via HFDL squitter 194*a*. At step 455, ground station 455 identifies a need to change HDR downlink frequency 192, due to interference or some other parameter monitored by ground station 150. HDR system control 186 of ground station 150 will then select an alternative HDR downlink frequency from the frequency band.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A method of transmitting at least one high data rate (HDR) packet via high frequency data link (HFDL), comprising:
    monitoring at least one ground station via at least one HFDL data radio installed in at least one aircraft, the ground station associated with at least one of a HF frequency band and a first frequency of the HF frequency band;
    receiving, at the first frequency, at least one first HDR frequency selected from the HF frequency band from the at least one ground station via the at least one HFDL data radio;
    logging into the at least one first HDR frequency via the at least one HFDL data radio; and
    transmitting to the at least one ground station at least one first data packet at the at least one first HDR frequency at a data rate greater than 1.8 kb/s via the at least one HFDL data radio.

2. The method of claim 1, further comprising:
    receiving at least one second HDR frequency selected from the HF frequency band from the at least one ground station via the at least one HFDL data radio;
    logging into the at least one second HDR frequency via the at least one HFDL data radio; and
    transmitting to the at least one ground station at least one second data packet at the at least one second HDR frequency at a data rate greater than 1.8 kb/s via the at least one HFDL data radio.

3. The method of claim 1, wherein the logging into the at least one first HDR frequency via the at least one HFDL data radio includes
    tuning an antenna of the at least one aircraft to the at least one first HDR frequency.

4. The method of claim 1, further comprising:
    receiving, via the HFDL data radio, at least one third data packet transmitted at a data rate greater than 1.8 kb/s by the at least one ground station at the at least one first HDR frequency; and
    decoding the at least one third data packet.

5. A system for transmitting at least one high data rate (HDR) packet via high frequency data link (HFDL), comprising:
    at least one antenna;
    at least one coupler connected to the at least one antenna and configured to tune into at least one frequency selected from a frequency band;
    at least one HFDL data radio coupled to the at least one antenna and configured to:
        (a) monitor at least one HFDL ground station, the HFDL ground station associated with at least one HF frequency band;
        (b) receive at least one first HDR frequency selected from the HF frequency band transmitted by the at least one ground station at an HFDL frequency selected from the HF frequency band;
        (c) log into the at least one HDR frequency; and
        (d) transmit at least one first data packet at the at least one first HDR frequency to the at least one ground station at a data rate greater than 1.8 kb/s.

6. The system of claim 5, wherein the at least one HFDL radio is further configured to tune the at least one antenna to the at least one first HDR frequency.

7. The system of claim 5, wherein the at least one HFDL radio is further configured to:
    receive at least one second HDR frequency selected from the HF frequency band transmitted by the at least one ground station at the HFDL frequency; and
    transmit at least one second data packet at the at least one second HDR frequency to the at least one ground station at a data rate greater than 1.8 kb/s.

8. The system of claim 5, wherein the at least one HFDL radio is further configured to:
    receive at least one third data packet transmitted by the at least one ground station at the at least one first HDR frequency at a data rate greater than 1.8 kb/s; and
    decode the at least one third data packet.

9. An apparatus for receiving at least one high data rate (HDR) packet transmitted via high frequency data link (HFDL), comprising:
    at least one antenna;
    at least one splitter coupled to the at least one antenna;
    at least one HFDL transceiver coupled to the at least one splitter, the at least one HFDL transceiver configured to transmit at least one first HDR frequency selected from a first frequency band associated with the HFDL transceiver to at least one aircraft via a first HFDL frequency;
    at least one HDR receiver coupled to the at least one splitter and configured to
        (a) select the at least one first HDR frequency from the first frequency band based on at least one first parameter;

(b) forward the at least one first HDR frequency to the at least one HFDL transceiver;
(c) recognize a successful login to the at least one HDR frequency by the at least one aircraft; and
(d) receive at least one first data packet transmitted at a data rate greater than 1.8 kb/s by the at least one aircraft at the at least one first HDR frequency.

10. The apparatus of claim 9, wherein the at least one HDR receiver is further configured to:
acknowledge receipt of the at least one HDR packet; and
decode the at least one HDR packet.

11. The apparatus of claim 9, wherein the at least one first parameter includes at least one of measured channel energy, known voice assignments, and channel activity received from at least one ground station.

12. The apparatus of claim 9, wherein the at least one HDR receiver is further configured to:
select at least one second HDR frequency from the frequency band based on at least one second parameter;
forward the at least one second HDR frequency to the at least one HFDL receiver/transceiver; and
receive at least one HDR packet transmitted by the at least one aircraft at the at least one second HDR frequency.

13. The apparatus of claim 12, wherein the at least one second parameter includes at least one of a threshold of non-HDR-HFDL signals at the first HDR frequency and detected interference with downlinks.

14. The apparatus of claim 9, wherein the at least one HDR receiver is an HDR transceiver further configured to transmit at least one second data packet to the at least one aircraft at a data rate greater than 1.8 kb/s via the at least one first HDR frequency.

15. The method of claim 1, wherein receiving at least one first HDR frequency from the at least one ground station at the first frequency via the at least one HFDL data radio includes:
receiving at least one first HDR frequency via at least one HFDL uplink squitter transmitted by the at least one ground station at the first frequency via the at least one HFDL data radio.

16. The system of claim 5, wherein the HFDL data radio is configured to receive the first HDR frequency via an HFDL uplink squitter transmitted by the at least one ground station at the first frequency.

17. The apparatus of claim 9, wherein the at least one HFDL transceiver is configured to transmit the at least one first HDR frequency to the at least one aircraft via an HFDL uplink squitter.

\* \* \* \* \*